Aug. 4, 1959
J. C. HILLYER ET AL
2,898,347
PROCESS FOR REACTING A DIOLEFIN AND A FURFURAL
Filed July 5, 1955
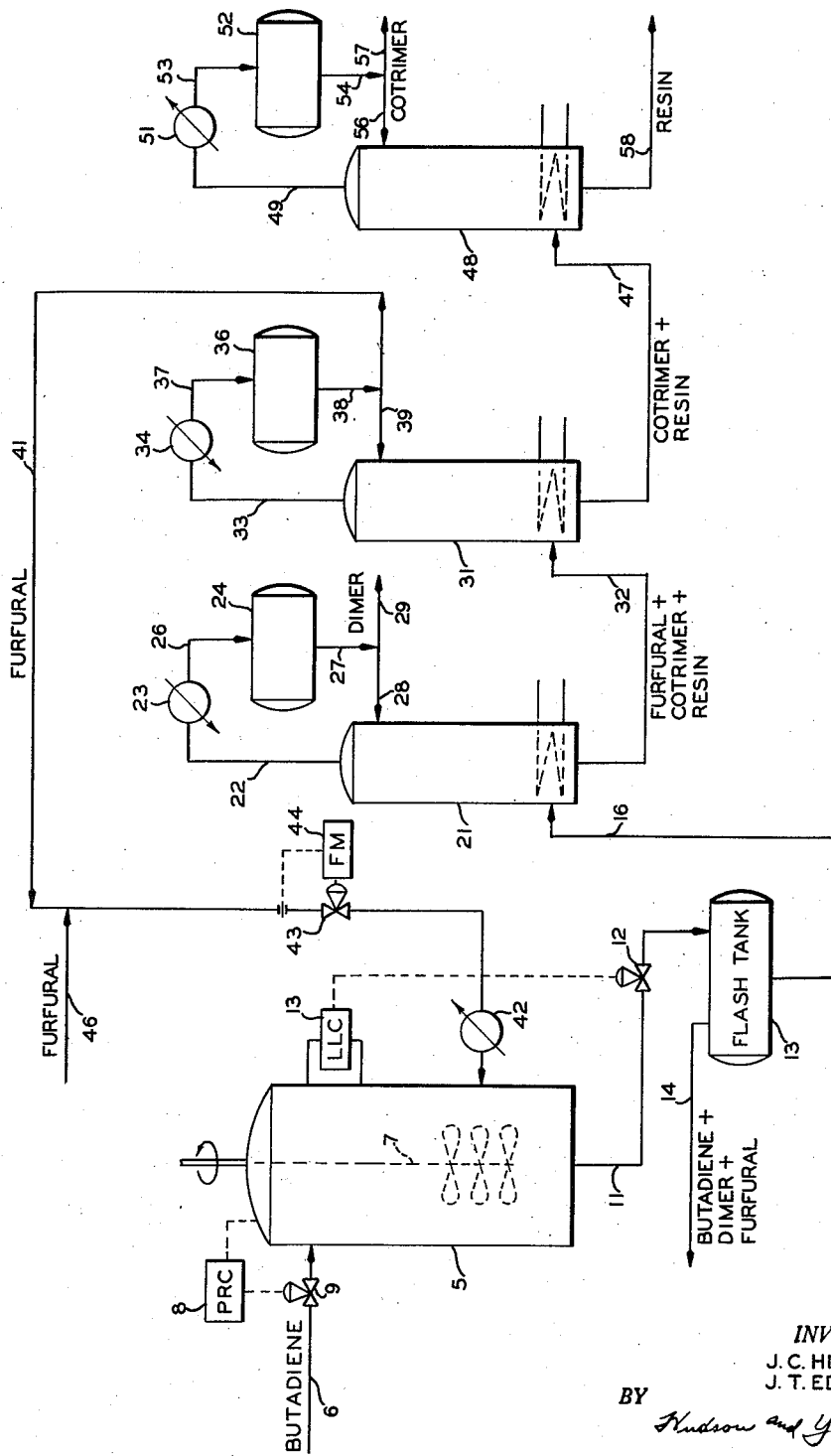
INVENTOR.
J. C. HILLYER
J. T. EDMONDS, JR.
BY
*Kudson and Young*
ATTORNEYS

United States Patent Office 2,898,347
Patented Aug. 4, 1959

2,898,347
PROCESS FOR REACTING A DIOLEFIN AND A FURFURAL

John C. Hillyer and James T. Edmonds, Jr., Bartlesville, Okla., assignors to Phillips Petroleum Company, a corporation of Delaware Application July 5, 1955, Serial No. 519,882

8 Claims. (Cl. 260—346.2)

This invention relates to a process for interacting a diolefin and a furfural. In one of its aspects, it relates to an improved process for synthesizing a butadiene-furfural cotrimer.

It has been recently disclosed in U.S. Patent No. 2,683,151, issued July 6, 1954, that a diolefin such as 1,3-butadiene and its immediate homologs may be reacted with a furfural, such as furfural itself and its immediate homologs, to produce new and useful products. Because of its many actual and potential uses, perhaps the most important of the reaction products formed is the butadiene-furfural cotrimer. In producing this aldehyde reaction product, two molecules of the diolefin react with one molecule of the furfural reactant by a modification of the Diels-Alder reaction. The process of the instant invention constitutes an improvement upon that disclosed in the above cited patent.

During the reaction of the diolefin and the furfural reactant, the same Diels-Alder type reaction is also responsible for the formation of the butadiene dimer vinylcyclohexene. The condensation of butadiene with itself to form butadiene dimer proceeds at a much greater rate than the condensation of butadiene with furfural. Furthermore, the formation of butadiene dimer is not an equilibrium reaction at the temperature of reaction, and its formation greatly decreases the quantity of butadiene available to react with the furfural. It becomes necessary, therefore, if high yields of the desired cotrimer product are to be obtained, to increase the reaction of butadiene with furfural while decreasing the competing reaction of butadiene with itself to form butadiene dimer. In accordance with this invention, a process is proposed whereby these desirable results are obtained.

The following are objects of the invention.

It is an object of this invention to provide an improved process for reacting a diolefin with a furfural.

Another object of the invention is to provide an improved process for producing 2,3,4,5-bis-($\Delta^2$-butenylene)-tetrahydrofurfural by reacting 1,3-butadiene and furfural.

Another object of the invention is to provide an improved process for producing in increased yields a cotrimer of butadiene and furfural.

Still another object of the invention is to provide a continuous process for synthesizing a butadiene-cotrimer in which the formation of butadiene dimer is reduced to a minimum.

A further object of the invention is to produce polycyclic aldehydes by the reaction of a diolefin and a furfural.

Other and further objects and advantages of the invention will become apparent to those skilled in the art upon consideration of the accompanying disclosure.

The butadiene-furfural cotrimer produced by this invention has many uses. Among these there may be mentioned its use as an insect repellent, as a plasticizer and/or tackifier for synthetic rubber, as a component in phenolic resins, and as a chemical intermediate for the synthesis of numerous organic chemicals. Still other uses will be apparent to those skilled in the art.

As a diolefin reactant in our process, we prefer to use a conjugated diolefin, preferably a conjugated diolefin having not more than about seven carbon atoms per molecule. Such a diolefin can be referred to as a member of the group consisting of 1,3-butadiene and its immediate homologues and may be reported as having the formula

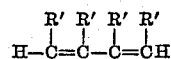

where each R' is of the group consisting of hydrogen and an alkyl group having not more than three carbon atoms and at least two R' are hydrogen. The furfural reactant employed in the practice of our invention can be referred to as one of the group consisting of furfural and its immediate homologues having not more than seven carbon atoms per molecule. Such a material may be said to be a compound having the formula

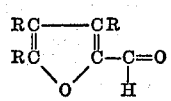

where each R is of the group consisting of hydrogen and methyl and at least one R is hydrogen. The more commonly used reactants are 1,3-butadiene and furfural, isoprene and furfural, and piperylene and furfural, and the corresponding diolefins with methylfurfural.

The diolefin-furfural cotrimers of this invention are formed by the reaction of two molecules of a diolefin with one molecule of a furfural. The aldehyde so formed may be represented by the following structural formula:

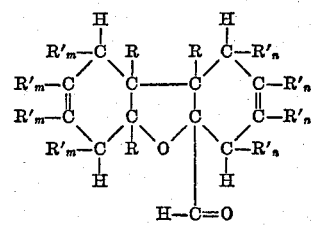

where each R is of the group consisting of hydrogen and methyl and at least one is hydrogen, and each R' is of the group consisting of hydrogen and an alkyl group having not more than three carbon atoms with the sum of the carbon atoms in the R'$_m$ and in the R'$_n$ in each case, not greater than three and at least two of the R'$_m$ and of the R'$_n$ are hydrogen. The aforementioned reaction is accompanied by a competing reaction, namely, the condensation of the diolefin with itself to form the diolefin dimer, which decreases the amount of diolefin available for reaction with the furfural. As a result, when carrying out the reaction in a batch type operation, the yield of cotrimer, based on diolefin converted, has been found to be relatively low, e.g., in the neighborhood of 20 percent or less.

We have now discovered that by controlling the rate of diolefin introduction so as to maintain a predetermined pressure in a closed reaction zone containing a furfural heated to reaction temperature, it is possible to obtain a cotrimer yield of from 45 to 50 percent and higher, based on the diolefin reacted. In a broad aspect, the process of this invention comprises introducing a diolefin into a closed reaction zone containing a furfural heated to reaction temperature, and controlling the rate of diolefin introduction so as to maintain a pressure therein between 50 and 150 p.s.i.g., preferably between 75 and 135 p.s.i.g. The cotrimer product formed by interaction of the diolefin and furfural can be recovered by distillation of the reaction mixture.

According to one embodiment of the invention, a diolefin, such as 1,3-butadiene, is introduced into a closed reaction zone containing a furfural, such as furfural itself, heated to a reaction temperature between 200 and 600° F., preferably between 350 and 450° F. Butadiene is charged to the reaction zone at a controlled rate so as to maintain a pressure therein between 50 and 150 p.s.i.g. The butadiene and furfural are reacted for a period between 1 and 50 hours or more, preferably between 5 and 15 hours.

In order to obtain the benefits of this invention, it becomes of primary importance to control the rate of butadiene introduction so as to maintain a reaction pressure in the above-identified range. While the over-all reaction rate may be increased many times by operating at higher pressures, the fraction of the butadiene converted to the cotrimer decreases materially at pressures above 150 p.s.i.g. with a corresponding increase in the fraction of the butadiene converted to the dimer. For example, it has been found that while the over-all reaction rate increased 12-fold as the reaction pressure was increased from 100 to 250 p.s.i.g., at 250 p.s.i.g. the fraction of butadiene converted to cotrimer decreased from an average of about 42 percent to about 17.5 percent while the fraction being converted to the dimer increased from an average of about 43 percent to about 76 percent.

Although the reaction temperature can vary within a wide range, e.g., between 200 and 600° F., and preferably between 350 and 450° F., while still obtaining increased cotrimer yield when operating according to this invention, it has been found to be even more desirable to operate at a reaction temperature between 375 and 425° F. Shorter reaction times are required at the higher temperatures, but under these conditions an increased amount of furfural is converted to tars and resins. Thus, optimum operating conditions, combining a reasonable reaction rate with the highest selectivity in the reaction of butadiene with furfural to form the cotrimer are between 375 and 425° F. at a pressure between 75 and 135 p.s.i.g.

It is preferred to utilize anhydrous furfural in order to minimize furfural homopolymerization and the possible formation of lactones. It is, however, within the scope of the invention to have some water present although it is desirable that the water content be maintained below about 5 percent by weight of the furfural. With regard to the diolefin reactant, inhibitors such as tertiary butylcatechol can be used therewith to inhibit homopolymerization of the diolefin.

Butadiene can be charged to the reaction zone by incremental addition, or the butadiene may be added continuously. In the incremental injection of the butadiene, the butadiene is generally introduced during a certain part of each hour of operation in amounts sufficient to maintain the pressure in the reaction zone in the desired pressure range. It is preferred, however, to introduce the butadiene in a continuous manner so as to maintain a preselected pressure within the reaction zone. The instant invention can be carried out as a batch type process with either incremental or continuous addition of the butadiene, or a continuous process can be utilized. The preferred mode of operation is to carry out the process in a continuous manner.

A more comprehensive understanding of the invention may be obtained by referring to the drawing which is a flow diagram of a preferred embodiment of the invention. Conventional apparatus such as valves, pumps, surge tanks, controllers, and the like have not been illustrated, but the inclusion of such apparatus is well within the scope of the invention.

Referring now to the drawing, there is illustrated schematically an arrangement of apparatus suitable for producing a butadiene-furfural cotrimer by a continuous process. Butadiene is pumped from a source, not shown, into closed reactor 5 through inlet line 6. Reactor 5 is provided with a suitable stirrer 7 which is rotated by a motor, not shown. The butadiene reacts with furfural contained in the reactor and heated to the desired reaction temperature as will be described more in detail hereinafter. It is within the scope of the invention to carry out the reaction in the presence of a solvent such as a paraffinic or aromatic hydrocarbon.

The rate of butadiene introduction into reactor 5 is controlled by means of pressure recorder-controller 8 which is operatively connected to reactor 5 and to motor valve 9 contained in inlet line 6. The controller is of a type well known in the art which is adapted to supply a pneumatic signal to the motor valve, which is proportional to the pressure in the reactor. As previously described, it is desired to carry out the reaction of butadiene with furfural at a predetermined reaction pressure. Accordingly, the controller is given an index setting corresponding to the pressure which it is desired to maintain within the reactor. The controller then operates to actuate motor valve 9 so that butadiene is introduced into the reactor at the rate required to maintain the set pressure.

The reaction products are removed from the reactor through line 11 at a rate dependent upon the setting of motor valve 12 contained in this line. Motor valve 12 is actuated by a liquid level controller 13 which is operatively connected to reactor 5. The liquid level controller adjusts valve 12 so as to maintain a predetermined liquid level within reactor 5. By controlling the rate of withdrawal of reaction products in this manner, the reactants are maintained within the reactor for the desired reaction period. The methods and means used for controlling the rate of butadiene introduction and the rate of withdrawal of reaction products are not a part of the instant invention, but are disclosed and claimed in copending U.S. patent applications.

The reaction products withdrawn from the reactor through line 11 are passed into flash tank 13 wherein the pressure is reduced from reaction pressure. Unreacted butadiene and some furfural and butadiene dimer are thereby flashed from the reaction products, being removed through line 14. The reaction products are withdrawn from flash tank 13 through line 16 and passed into fractionator 21 wherein the butadiene dimer is separated from the reaction products. In this separation, the dimer is taken overhead as a vapor through line 22 and passed into a condenser 23 wherein it is condensed. The condensate is passed from condenser 23 into accumulator 24 through line 26. The dimer is removed from the accumulator through line 27, a portion being introduced into fractionator 21 through line 28 as reflux. The remainder of the dimer is recovered by means of line 29.

The kettle product withdrawn from fractionator 21 comprises furfural, butadiene-furfural cotrimer and a small amount of resinous material. The kettle product from fractionator 21 is introduced into fractionator 31 via line 32. In this fractionator, furfural is taken overhead through line 33 and passed into condenser 34 wherein it is condensed, the condensate then being introduced into accumulator 36 through line 37. A portion of the furfural removed from accumulator 36 via line 38 is introduced into fractionator 31 as reflux through line 39 while the remainder of the furfural is recycled to reactor 5 by means of recycle line 41.

Recycle line 41 contains a heater 42 through which the furfural passes prior to introduction into the reactor. In heater 42, the furfural is heated to the temperature at which it is desired to react the butadiene and furfural. By continuously circulating the furfural in this manner and heating same before injecting into the reactor, it is possible to maintain the desired reaction temperature in the reactor. The rate at which furfural is charged to the reactor is controlled by means of valve 43 contained in recycle line 41. The valve is operatively connected to a flow meter 44 which is given a setting corresponding to the rate at which furfural is to be introduced into the reactor. In carrying out the instant invention, sufficient furfural is charged to the reactor to maintain an excess therein over that required for the reaction. Line 46 provides means for introducing makeup furfural into the system.

The kettle product recovered from fractionator 31 through line 47 comprises the butadiene-furfural cotrimer and a small amount of resinous material. The kettle product is introduced into fractionator 48 by means of line 47. In fractionator 48, the desired separation of cotrimer from resin is made with the cotrimer being taken overhead through line 49. The vaporous cotrimer is condensed in condenser 51, and the resulting condensate passed into accumulator 52 by means of line 53. A portion of the cotrimer removed from accumulator 52 by line 54 is passed as reflux into fractionator 48 through line 56. The remainder of the butadiene-furfural cotrimer is recovered through line 57 as the product of the process and passed to suitable storage facilities. The resinous material is removed from the bottom of the fractionator 48 through line 58.

As discussed hereinabove, the process of this invention can be practiced in a batch as well as a continuous operation. In a batch type operation, furfural heated to the desired reaction temperature is initially charged into a reactor similar to that shown in the drawing. Thereafter, butadiene is injected into the reactor so as to maintain the pressure therein between 50 and 150 p.s.i.g. The butadiene can be either introduced continuously as described in conjunction with the apparatus of the drawing, or it can be charged incrementally to the reactor as specified periods during the reaction time. At the end of the desired reaction period, the reactor is emptied and the reactor effluent passed to a surge and flash tank. The pressure in the surge and flash tank is bled down, e.g. from 150 to 5 p.s.i.g., over an extended period of time, e.g., over a period of about two hours. The flash vapors from the surge and flash tank, which comprise essentially butadiene, butadiene dimer and furfural, may be passed to a storage tank for subsequent recycle to the reactor. The liquid material withdrawn from the surge and flash tank is charged to a batch fractionator which operates to separate the material into butadiene dimer, furfural and the cotrimer product. The furfural removed from the batch fractionator can be sent to a furfural storage tank for subsequent recycle to the reactor. As an alternate procedure, the unreacted butadiene can be bled from the reactor and the liquid portion of the reaction mixture fractionated or treated as desired.

A more comprehensive understanding of the invention may be obtained by referring to the following illustrative examples which are not intended, however, to be unduly limitative of the invention.

EXAMPLE I

A sample of furfural was prepared by distilling commercial furfural in a 14-inch Vigreux column. The distillations were done at 10 to 15 mm. mercury pressure and only the middle fifty percent of the distillate was used for these experiments. A charge of 800 gm. (8.33 moles) of this furfural was charged to an iron bomb which was then sealed and placed in a bath, cooled with solid carbon dioxide. After cooling for 20 minutes, the air in the bomb was removed with a vacuum pump. The bomb was then placed in an electric heating coil on a platform rocker and connected to a vessel containing pure grade butadiene. The butadiene vessel, which was fitted with a sight gauge, was pressurized with nitrogen. The bomb was heated to the desired operating temperature and the butadiene was charged by hand control at such intervals that the pressure in the reactor remained within the range of 80 to 150 p.s.i.g.

On the completion of the reaction, the bomb was cooled to room temperature and the pressure was released. The gases were passed through a Dry Ice trap to collect the unreacted butadiene. The liquid portion of the reaction mixture was then distilled and several fractions were collected. At an absolute pressure of about one mm. of mercury, the butadiene-furfural cotrimer boils at about 115° C. The residue from the distillation also probably contains some heavier polymers of the cotrimer. The data obtained from three runs, namely A, B and C, when operating in this manner are summarized in Table II hereinbelow.

The cotrimer, 2,3,4,5-bis($\Delta^2$-butenylene)-tetrahydrofurfural, was a straw colored liquid with the empirical formula $C_{13}H_{16}O_2$. The distillation data for the reaction products from run B is set forth in Table I hereinbelow. The cotrimer was contained in fractions 9 and 10 as shown in Table I. The residue from distillation was an amber-colored resin, soluble in acetone, and assumed to be higher polymers of the butadiene-furfural cotrimer.

Table I

DISTILLATION DATA

| Cut | Temperature, °C. | Pressure, mm. Mercury | Weight, gms. | |
|---|---|---|---|---|
| 1 | 135 | 754 | 51.1 | butadiene dimer. |
| 2 | 155 | 754 | 9.2 | intermediate fraction. |
| 3 | 68 | 25 | 127.3 | |
| 4 | 69 | 25 | 142.3 | |
| 5 | 69 | 25 | 132.0 | furfural. |
| 6 | 69 | 25 | 138.3 | |
| 7 | 71 | 25 | 129.4 | |
| 8 | 85 | 1.4 | 10.4 | intermediate fraction. |
| 9 | 125 | 2.1 | 135.0 | cotrimer fraction. |
| 10 | 125 | 2.1 | 6.9 | |

| | |
|---|---|
| Charge gms | 975.5 |
| Products: | |
| Trap gms | 3.2 |
| Distillate gms | 881.9 |
| Residue gms | 64.3 |
| Total gms | 949.4 |
| Losses gms | 26.1 |
| Percent recovered | 97.2 |

EXAMPLE II

The same reactants were used in this example as in Example I. The furfural (800 gms.) was charged to a steel bomb, sealed and placed in a bath cooled with solid carbon dioxide. After cooling for 20 minutes, the air in the bomb was removed with a vacuum pump and the butadiene was charged to the cooled bomb until the desired weight had been added. The bomb was then allowed to warm to room temperature and the contents mixed thoroughly, after which the bomb was placed in a hot oil bath and brought to the operating temperature. At the end of the reaction time, the reaction products were treated in the same manner as described in Example I. The data obtained from four runs, namely runs D, E, F and G, when operating in this manner are summarized in Table II hereinbelow.

It is evident from an examination of the data contained in Table II that by incrementally injecting butadiene so as to maintain a predetermined reaction pressure, the fraction of butadiene converted to cotrimer was materially increased over that obtained in the batch reactions.

Table II

| Run | Temp., °F. | Time, Hours | Butadiene Charged | | Cotrimer Yield | | Butadiene Conversion Percent [2,3] | $C_4H_6$ Selectivity to Cotrimer, Percent |
|---|---|---|---|---|---|---|---|---|
| | | | Gms. | Moles | Gms. | Moles | | |
| A | 390-395 | 10 | 187 | 3.46 | 134.9 | 0.661 | 86.5 | 44.1 |
| B | 430-437 | 8.5 | 175.5 | 3.25 | 141.9 | 0.696 | 86.9 | 49.4 |
| C[1] | 390-410 | 8.8 | 124.3 | 2.30 | 89.23 | 0.438 | 81.0 | 46.3 |
| D | 230 | 97 | 205.5 | 3.80 | 21.5 | 0.105 | 68.1 | 8.1 |
| E | 350 | 48 | 206.0 | 3.81 | 75.6 | 0.371 | 100.0 | 19.5 |
| F | 350 | 6 | 187.5 | 3.48 | 64.0 | 0.313 | 93.1 | 19.4 |
| G | 395 | 2 | 205.5 | 3.80 | 68.0 | 0.333 | 94.4 | 18.5 |

Note.—All runs contained 800 gm. furfural.
[1] Furfural contained 1.64 percent water.
[2] Resin boiling above cotrimer was assumed to be the polymerization product of the cotrimer $(C_{13}H_{16}O_2)_x$.
[3] Computed as the difference between the total butadiene charged and the butadiene recovered divided by the total butadiene charged.

EXAMPLE III

A one gallon, stirred autoclave was used as the reactor in this example. The reactor was provided with an internal cooling coil, stirrer, thermocouple well and a product blowout tube which extended to the bottom of the reactor. The reactor was heated by means of surrounding heating bars built within the reactor assembly. The amount of cooling medium supplied to the cooling coil was determined by manual control of a valve in the line supplying the cooling medium to the coil.

Dry, distilled furfural was pulled by vacuum into the cold reactor through the blowout tube. The reactor was then heated, and when the desired reaction temperature was reached, inhibitor-free butadiene was pumped into the reactor. Precautions were taken to ensure that no air was present in the reactor. After sufficient butadiene was charged to the reactor to achieve the desired operating pressure, the reactor pressure was maintained within plus or minus 2 pounds of the desired operating pressure by means of a suitable arrangement of control apparatus.

The amount of butadiene added to the reactor was determined by occasional weighing of the butadiene charge tank. When the desired amount of butadiene had been added, the run was terminated. Heat to the reactor was then shut off and cooling water passed through the internal cooling coil to cool the reaction mixture. Cooling was terminated when the reactor pressure dropped to about 30 p.s.i.g. The reaction mixture was collected in a series of condensing units, including a Dry Ice acetone trap. The reaction mixture was removed from the reactor at such a rate that all of the butadiene vapors were condensed in the Dry Ice trap.

Distillation of the normally liquid fraction of the reactor product was done in two steps. First, butadiene, dimer and most of the furfural was taken overhead in a 25 mm. O.D. Hyper-Cal column. When pot product occupied less than 500 ml., it was transferred to a 500 ml. flask and distilled in a smaller column packed with Heligrid packing. Care was taken to allow good column drainage before each transfer. After emptying the reactor and recording the weight of unreacted butadiene collected, the liquid product mixture was kept at Dry Ice temperatures until it could be charged, still cold, to a tared fractionation pot. Heat was applied slowly at first during fractionation until pot temperature reached room temperature and then the mixture was heated at a rather fast rate. Butadiene evolved was collected in a Dry Ice cooled trap and weighed. The pot was heated until butadiene dimer (B.P. 129-30° C.) began refluxing.

Yields of each component were calculated on the basis of butadiene reacted. Pot residue was assumed to be 100 percent cotrimer resin. Summarized data for the runs are tabulated in Table III.

Table III

SUMMARIZED DATA SHOWING EFFECT OF PRESSURE, TEMPERATURE, AND WEIGHT RATIO ON BUTADIENE CONVERSION TO COTRIMER

| Run No. | Operating Conditions | | | | Recipe, gms. | | Ave. Butadiene Rates, Gms. Bd. Per Kg. Furfural Per Hour | |
|---|---|---|---|---|---|---|---|---|
| | Temp., °F. | Pressure, p.s.i.g. | Run Duration, Hours | Wt. Ratio,[4] Butadiene: Furfural | Butadiene[1] | Furfural | Feed | Reaction |
| 1 | 400 | 100 | 1.6 | 1:14.7 | 68 | 1,000 | 69.4 | 42.4 |
| 2 | 400 | 100 | 3.7 | 1:8.35 | 120 | 1,000 | 44.6 | 32.0 |
| 3 | 400 | 100 | 7.2 | 1:5.4 | 250 | 1,350 | 37.3 | 28.8 |
| 4 | 400 | 100 | 7.2 | 1:4.4 | 228 | 1,000 | 39.7 | 31.8 |
| 5 | 400 | 100 | 14.75 | 1:2.43 | 412 | 1,000 | 30.9 | 27.9 |
| 6 | 400 | 100 | 14.5 | 1:2.24 | 446 | 1,000 | 34.5 | 30.8 |
| 7 | 400 | 75 | 37.0 | 1:2.60 | 384 | 1,000 | 12.2 | 10.4 |
| 8 | 400 | 150 | 7.5 | 1:1.53 | 651 | 1,000 | 97.6 | 86.9 |
| 9 | 400 | 250 | 2.5 | 1:1.13 | 888 | 1,000 | 396.0 | 355.0 |
| 10 | 425 | 100 | 15.0 | 1:2.52 | 396 | 1,000 | 29.0 | 26.4 |
| 11 | 375 | 100 | 18.0 | 1:2.24 | 447 | 1,000 | 28.2 | 24.8 |

Footnotes on next page.

Table III—Continued

| Run No. | Butadiene Conversion, wt. percent | Effluent Composition, weight percent of Furfural plus reacted Butadiene Charge (Butadiene Free) | | | | | Butadiene Yields, wt. percent of Butadiene Reacted | | | | Furfural Yields, wt. percent | | | Lbs. cotrimer per lb. Butadiene Reacted |
|---|---|---|---|---|---|---|---|---|---|---|---|---|---|---|
| | | Dimer | COD [2] | Furfural | Cotrimer | Resin | Dimer | COD [2] | Cotrimer | Resin | Recovered | Cotrimer | Resin | |
| 1 | 61.2 | 2.5 | [3] | 89.0 | 5.4 | 1.7 | 39.8 | [3] | 45.7 | 17.0 | 95.4 | 2.7 | 0.8 | 0.852 |
| 2 | 71.8 | 4.5 | [3] | 83.5 | 8.5 | 3.5 | 41.7 | [3] | 41.7 | 16.6 | 94.2 | 4.4 | 1.8 | 0.782 |
| 3 | 77.3 | 6.8 | [3] | 76.0 | 13.0 | 3.8 | 43.2 | [3] | 44.0 | 12.8 | 90.0 | 7.2 | 2.1 | 0.770 |
| 4 | 80.1 | 6.9 | [3] | 70.0 | 14.7 | 6.7 | 37.4 | [3] | 42.3 | 19.3 | 86.2 | 8.5 | 3.9 | 0.794 |
| 5 | 90.3 | 13.6 | [3] | 55.6 | 22.3 | 6.6 | 47.0 | [3] | 40.8 | 12.2 | 79.1 | 14.9 | 4.4 | 0.770 |
| 6 | 89.3 | 14.3 | [3] | 52.3 | 24.6 | 4.9 | 47.6 | [3] | 43.5 | 8.9 | 77.9 | 17.2 | 3.9 | 0.818 |
| 7 | 85.3 | 7.6 | 1.0 | 52.7 | 21.6 | 14.5 | 27.2 | 3.4 | 41.1 | 28.3 | 72.9 | 14.0 | 9.5 | 0.730 |
| 8 | 89.0 | 25.8 | 1.7 | 47.0 | 17.5 | 6.5 | 64.0 | 4.1 | 23.3 | 8.6 | 75.9 | 13.3 | 4.9 | 0.424 |
| 9 | 89.7 | 33.6 | 2.9 | 43.0 | 15.7 | 4.0 | 70.3 | 6.1 | 17.6 | 4.5 | 81.4 | 13.8 | 3.6 | 0.328 |
| 10 | 91.1 | 7.3 | 1.3 | 53.6 | 22.4 | 13.6 | 26.4 | 4.7 | 42.8 | 26.1 | 74.8 | 14.7 | 8.9 | 0.762 |
| 11 | 88.0 | 12.9 | 1.8 | 53.0 | 24.6 | 6.9 | 40.9 | 5.8 | 41.6 | 11.7 | 74.5 | 16.5 | 4.6 | 0.755 |

[1] Butadiene reacted
[2] Cyclooctadiene.
[3] Included in dimer fraction.
[4] Reactants.

An examination of the data set forth in Table III indicates that varying the butadiene to furfural ratio had very little effect on selectivity or reaction rate. Pressure had a very marked effect on results, the over-all reaction rate increasing 12-fold as pressure increased from 100 to 250 p.s.i.g. At 250 p.s.i.g., however, the fraction of butadiene converted to cotrimer dropped from an average of about 42 percent to about 17.5 percent, and the fraction converted to dimer increased from an average of about 43 percent to about 76 percent.

It will be apparent to those skilled in the art that various modifications of the invention can be made upon study of the accompanying disclosure. Such modifications are believed to be clearly within the spirit and scope of the invention.

We claim:

1. A process for producing an aldehyde having the formula

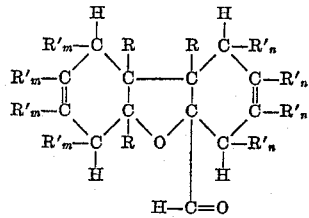

where R is selected from the group consisting of hydrogen and methyl and at least one R is hydrogen, and R' is selected from the group consisting of hydrogen and an alkyl group containing not more than three carbon atoms with the sum of the carbon atoms in the $R'_m$ and in the $R'_n$ in each case not greater than three and at least two of the $R'_m$ and of the $R'_n$ are hydrogen, which comprises introducing a conjugated diolefine hydrocarbon, having not more than seven carbon atoms per molecule and the formula

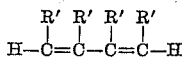

where R' is selected from the group consisting of hydrogen and an alkyl group having not more than three carbon atoms per molecule and at least two R"s are hydrogen, into a closed reaction zone containing a furfural having not more than seven carbon atoms per molecule and the formula

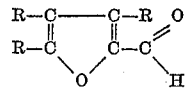

where R is selected from the group consisting of hydrogen and methyl and at least one R is hydrogen until the pressure in said reaction zone is between about 50 and 150 p.s.i.g.; reacting said diolefin hydrocarbon and said furfural at a temperature between about 200° F. and 600° F.; controlling the rate at which additional diolefin hydrocarbon is introduced into said reaction zone so as to maintain the pressure therein between about 50 and 150 p.s.i.g.; and recovering from said reaction zone reaction products comprising said aldehyde.

2. The process of claim 1 in which said diolefin hydrocarbon and said furfural are reacted at a temperature between about 350 and 450° F. and said diolefin hydrocarbon is introduced into said reaction zone at a rate such as to maintain a pressure therein between about 80 and 135 p.s.i.g.

3. A process for the production of 2,3,4,5-bis ($\Delta^2$-butenylene)-tetrahydrofurfural which comprises introducing 1,3-butadiene into a closed reaction zone containing furfural; reacting said 1,3-butadiene with said furfural at a temperature in the range of from about 200° F. to about 600° F. for a period of time between about 1 and 50 hours; controlling the rate at which said 1,3-butadiene is introduced into said reaction zone so as to maintain a pressure therein between about 50 and 150 p.s.i.g.; and recovering from said reaction zone reaction products comprising 2,3,4,5-bis ($\Delta^2$ - butenylene) - tetrahydrofurfural.

4. The process of claim 3 in which said 1,3-butadiene and said furfural are reacted at a temperature in the range of from about 350° F. to about 450° F. for a period of time between about 5 and 15 hours and said 1,3-butadiene is introduced into said reaction zone at a rate such as to maintain a pressure therein between about 80 and 135 p.s.i.g.

5. A process for the production of the cotrimer of 1,3-butadiene and furfural which comprises continuously introducing 1,3-butadiene into a closed reaction zone containing furfural; reacting said 1,3-butadiene with said furfural for a period of time between about 1 and 50 hours; controlling the rate of butadiene introduction so as to maintain a pressure in said reaction zone between about 50 and 150 p.s.i.g.; removing reaction products from said reaction zone and passing same into a flash zone; flashing vapors comprising unreacted 1,3-butadiene from said reaction products in said flash zone; passing butadiene-free reaction products from said flash zone into a first separation zone; separating butadiene dimer from said butadiene-free reaction products in said first separation zone; recovering a stream comprising furfural, the product cotrimer and a resinous material from said first separation zone; passing the last mentioned stream into a second separation zone; separating furfural from the materials in said second separation zone; heating said furfural recovered from said second separation zone to a temperature in the range of from about 200° F. to 600° F.; recycling said heated furfural to said reaction zone; recovering a stream comprising the product cotrimer and resinous material from said second separation zone; passing said last-mentioned stream into a third separation zone; and recovering said cotrimer from said third separation zone as a product of the process.

6. The process of claim 5 in which said 1,3-butadiene and said furfural are reacted for a period of time in the range of from about 5 to 15 hours; said 1,3-butadiene is introduced into said reaction zone at a rate such as to maintain a pressure therein between about 80 and 135 p.s.i.g.; and said recycle furfural is heated to a temperature in the range of from about 350° F. to about 450° F. p.s.i.g. prior to introduction into said reaction zone.

7. In the process of producing a conjugated diene-furfural cotrimer by reacting a conjugated diene with furfural in a closed reaction zone at a temperature in the range of about 200° F. to about 600° F., the improvement comprising introducing the furfural to said reaction zone, introducing said diene to said reaction zone at a rate to maintain the pressure in said zone in the range 50 p.s.i.g. to 150 p.s.i.g. and thereafter recovering from said reaction zone reaction products comprising said conjugated diene-furfural cotrimer.

8. The improvement of claim 7 wherein the conjugated diene contains 4 to 7 carbon atoms per molecule and the furfural contains 5 to 7 carbon atoms per molecule.

References Cited in the file of this patent

UNITED STATES PATENTS

| 2,483,903 | Herbolsheimer | Oct. 4, 1949 |
| 2,683,151 | Hillyer | July 6, 1954 |

OTHER REFERENCES

Hillyer: Ind. Eng. Chem., vol. 40, pp. 2216–2220 (1948).